(12) United States Patent
Ramsey et al.

(10) Patent No.: US 7,606,700 B2
(45) Date of Patent: Oct. 20, 2009

(54) ADAPTIVE TASK FRAMEWORK

(75) Inventors: William D. Ramsey, Redmond, WA (US); Jonas Barklund, Kirkland, WA (US); Sanjeev Katariya, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/270,393

(22) Filed: Nov. 9, 2005

(65) Prior Publication Data

US 2007/0106495 A1    May 10, 2007

(51) Int. Cl.
    G06F 17/27    (2006.01)
(52) U.S. Cl. .............................. 704/9; 704/257; 704/251
(58) Field of Classification Search ................. 704/251, 704/257, 275, 10, 9, 8, 270, 1, 7, 3, 4, 252
    See application file for complete search history.

(56) References Cited

U.S. PATENT DOCUMENTS

| | | | |
|---|---|---|---|
| 4,736,296 A | 4/1988 | Katayama et al. | |
| 4,965,763 A | 10/1990 | Zamora | |
| 4,974,191 A | 11/1990 | Amirghodsi et al. | |
| 5,208,816 A | 5/1993 | Seshardi et al. | |
| 5,477,451 A | 12/1995 | Brown et al. | |
| 5,577,241 A | 11/1996 | Spencer | |
| 5,625,814 A | 4/1997 | Luciw | |
| 5,636,036 A | 6/1997 | Ashbey | |
| 5,696,962 A | 12/1997 | Kupiec | |
| 5,748,974 A | 5/1998 | Johnson | |
| 5,752,244 A | 5/1998 | Rose et al. | |
| 5,754,173 A | 5/1998 | Hiura et al. | |
| 5,754,174 A | 5/1998 | Carpenter et al. | |
| 5,794,259 A | 8/1998 | Kikinis | |
| 5,832,459 A | 11/1998 | Cameron et al. | |
| 5,855,015 A | 12/1998 | Shoham | |
| 5,892,900 A | 4/1999 | Ginter et al. | |
| 5,999,948 A | 12/1999 | Nelson et al. | |
| 6,088,700 A | 7/2000 | Larsen et al. | |
| 6,118,939 A | 9/2000 | Nack et al. | |
| 6,212,494 B1 | 4/2001 | Boguraev | |
| 6,278,996 B1 | 8/2001 | Richardson et al. | |

(Continued)

FOREIGN PATENT DOCUMENTS

| | | | |
|---|---|---|---|
| WO | 0129823 A1 | 4/2001 |
| WO | 03001413 A1 | 1/2003 |
| WO | WO 2004/017230 A1 | 2/2004 |
| WO | WO 2005/036365 A2 | 4/2005 |

OTHER PUBLICATIONS

U.S. Appl. No. 11/290,076, filed Nov. 30, 2005, Ramsey, et al.

(Continued)

*Primary Examiner*—Huyen X. Vo
(74) *Attorney, Agent, or Firm*—Merchant & Gould P.C.

(57) ABSTRACT

The subject disclosure pertains to systems and methods for performing natural language processing in which natural language input is mapped to a task. The system includes a task interface for defining a task, the associated data and the manner in which the task data is interpreted. Furthermore, the system provides a framework that manages the tasks to facilitate natural language processing. The task interface and framework can be used to provide natural language processing capabilities to third party applications. Additionally, the task framework can learn or be trained based upon feedback received from the third party applications.

13 Claims, 12 Drawing Sheets

U.S. PATENT DOCUMENTS

| | | | |
|---|---|---|---|
| 6,314,398 B1* | 11/2001 | Junqua et al. | 704/257 |
| 6,513,006 B2* | 1/2003 | Howard et al. | 704/257 |
| 6,643,620 B1* | 11/2003 | Contolini et al. | 704/270 |
| 6,675,159 B1 | 1/2004 | Lin et al. | |
| 6,678,677 B2 | 1/2004 | Roux et al. | |
| 6,678,694 B1 | 1/2004 | Zimmermann et al. | |
| 6,690,390 B1 | 2/2004 | Walters et al. | |
| 6,724,403 B1 | 4/2004 | Santoro et al. | |
| 6,751,606 B1 | 6/2004 | Fries et al. | |
| 6,816,857 B1 | 11/2004 | Weissman et al. | |
| 6,850,252 B1 | 2/2005 | Hoffberg | |
| 6,901,399 B1 | 5/2005 | Corston et al. | |
| 6,904,402 B1 | 6/2005 | Wang et al. | |
| 6,910,003 B1 | 6/2005 | Arnold et al. | |
| 6,947,923 B2 | 9/2005 | Cha et al. | |
| 7,020,607 B2* | 3/2006 | Adachi | 704/257 |
| 7,020,658 B1 | 3/2006 | Hill | |
| 2002/0042793 A1 | 4/2002 | Choi | |
| 2002/0045463 A1 | 4/2002 | Chen et al. | |
| 2002/0049750 A1 | 4/2002 | Venkatram | |
| 2002/0065959 A1 | 5/2002 | Kim et al. | |
| 2002/0101448 A1 | 8/2002 | Sanderson | |
| 2002/0124115 A1 | 9/2002 | McLean et al. | |
| 2002/0143949 A1 | 10/2002 | Rajarajan et al. | |
| 2002/0152190 A1 | 10/2002 | Biebesheimer et al. | |
| 2003/0084035 A1 | 5/2003 | Emerick | |
| 2003/0120700 A1 | 6/2003 | Boudnik et al. | |
| 2003/0135584 A1 | 7/2003 | Roberts et al. | |
| 2003/0222912 A1 | 12/2003 | Fairweather | |
| 2004/0030556 A1 | 2/2004 | Bennett | |
| 2004/0030697 A1 | 2/2004 | Chochran et al. | |
| 2004/0030710 A1 | 2/2004 | Shadle | |
| 2004/0034652 A1 | 2/2004 | Hofmann et al. | |
| 2004/0111419 A1 | 6/2004 | Cook et al. | |
| 2004/0117395 A1 | 6/2004 | Gong et al. | |
| 2004/0122674 A1 | 6/2004 | Bangalore et al. | |
| 2004/0130572 A1 | 7/2004 | Bala | |
| 2004/0148154 A1 | 7/2004 | Acero et al. | |
| 2004/0181749 A1 | 9/2004 | Chellapilla et al. | |
| 2004/0236580 A1 | 11/2004 | Bennett | |
| 2004/0250255 A1 | 12/2004 | Kraiss et al. | |
| 2004/0260534 A1 | 12/2004 | Pak et al. | |
| 2005/0027666 A1 | 2/2005 | Beck et al. | |
| 2005/0028133 A1 | 2/2005 | Ananth et al. | |
| 2005/0034098 A1 | 2/2005 | DeSchryver et al. | |
| 2005/0044058 A1 | 2/2005 | Matthews et al. | |
| 2005/0049852 A1 | 3/2005 | Chao | |
| 2005/0049874 A1 | 3/2005 | Coffman et al. | |
| 2005/0065995 A1 | 3/2005 | Milstein et al. | |
| 2005/0075859 A1 | 4/2005 | Ramsey | |
| 2005/0075878 A1 | 4/2005 | Balchandran et al. | |
| 2005/0078805 A1 | 4/2005 | Mills et al. | |
| 2005/0080625 A1 | 4/2005 | Bennett et al. | |
| 2005/0080782 A1 | 4/2005 | Ratnaparkhi et al. | |
| 2005/0086059 A1 | 4/2005 | Bennett | |
| 2005/0114854 A1 | 5/2005 | Padisetty et al. | |
| 2005/0131672 A1 | 6/2005 | Dalal et al. | |
| 2005/0132380 A1 | 6/2005 | Chow | |
| 2005/0137939 A1 | 6/2005 | Calabria et al. | |
| 2005/0144064 A1 | 6/2005 | Calabria et al. | |
| 2005/0144065 A1 | 6/2005 | Calabria et al. | |
| 2005/0187818 A1 | 8/2005 | Zito et al. | |
| 2005/0193055 A1 | 9/2005 | Angel et al. | |
| 2005/0216356 A1 | 9/2005 | Pearce et al. | |
| 2005/0283473 A1 | 12/2005 | Rousso et al. | |
| 2006/0005207 A1 | 1/2006 | Louch et al. | |
| 2006/0059434 A1 | 3/2006 | Boss et al. | |
| 2006/0107219 A1 | 5/2006 | Ahya et al. | |
| 2006/0156248 A1 | 7/2006 | Chaudhri et al. | |
| 2006/0206835 A1 | 9/2006 | Chaudhri et al. | |
| 2007/0038934 A1 | 2/2007 | Fellman | |
| 2007/0101279 A1 | 5/2007 | Chaudhri et al. | |
| 2007/0101297 A1 | 5/2007 | Forstall et al. | |
| 2007/0106495 A1 | 5/2007 | Ramsey et al. | |
| 2007/0192179 A1 | 8/2007 | Van Luchene | |

OTHER PUBLICATIONS

U.S. Appl. No. 11/246,847, filed Oct. 7, 2005, Ramsey, et al.
U.S. Appl. No. 11/270,407, filed Nov. 9, 2005, Ramsey, et al.
U.S. Appl. No. 11/294,581, filed Dec. 5, 2005, Yao, et al.
U.S. Appl. No. 11/294,262, filed Dec. 5, 2005, Ramsey, et al.
U.S. Appl. No. 11/294,265, filed Dec. 5, 2005, Ramsey, et al.
"DTS: Programming: Creating the Custom Task Framework", 1 page, accessible at: http://msdn.microsoft.com/library/default.asp?url=/library/en-us/dtsprog/dtspcusttskc_3hwr.asp, last accessed Jan. 5, 2006.
Ernst, et al., "A Task Framework for the Web Interface W2H", Bioinformatics, 2003, pp. 278-282, vol. 19, No. 2, Oxford University Press.
Multi-Agent Systems Lab, "TAEMS: A Framework for Task Analysis, Environment Modeling, and Simulation", 3 pages, acessible at: http://dis.cs.umass.edu/research/taems/, last accessed Jan. 5, 2006.
Hochberg, et al., "A Flexible Framework for Developing Mixed-Initiative Dialog Systems", Association for Computational Linguistics, Proceedings of the Third SIGdial Workshop on Discourse and Dialogue, Jul. 2002, pp. 60-63, Philadelphia.
AgileTek, "Componentized Architecture", 2 pages, accessible at: http://www.agiletek.com/agileplus#CompArchitecture, last accessed Jan. 5, 2006.
H. Lieberman, et al., "Instructible Agents: Software That Just Keeps Getting Better", IBM Systems Journal, 1996, pp. 539-556, vol. 35, Nos. 3 and 4.
"Technical Forum: Machine Intelligence and the Turing Test", IBM Systems Journal, 2002, pp. 524-539, vol. 41, No. 3.
O. Conlan, et al., "Applying Adaptive Hypermedia Techniques to Semantic Web Service Composition", In Proceedings of AH 2003: Workshop on Adaptive Hypermedia and Adaptive Web-based Systems, 2003, pp. 53-62.
H. Liu, et al., "GOOSE: A Goal-Oriented Search Engine with Commonsense", Adaptive Hypermedia and Adaptive Web-Based Systems, Second International Conference, AH 2002, Malaga, Spain, May 29-31, 2002, Lecture Notes in Computer Science, pp. 253-263, No. 2347.
Leon Peshkin, "Research Statement", 2 pages, accessible at: http://people.csail.mit.edu/pesha/my_res.pdf, last accessed Jan. 5, 2006.
Korns Associates "Our Intelligent Agents", 4 pages, accessible at: http://www.korns.com/technology.htm, last accessed Jan. 5, 2006.
V. Chepegin, et al., "CHIME: Service-Oriented Framework for Adaptive Web-Based Systems", in Paul De Bra (ed): Proceedings of Dutch national conference InfWet, Eindhoven, the Netherlands, Nov. 20, 2003, pp. 29-36.
Esposito, Dino. "Browser Helper Objects:The Browser the Way You Want It." Microsoft Corporation, Jan. 1999, 12 pages .
International Search Report dated Mar. 29, 2007, mailed Mar. 30, 2007, for International Application No. PCT/US2006/044418, 3 pages.
Mills, "Google Flight search takes off", http://www.news.com/Google-flight-search-takes-pff/2100-1038_3-5917821.html: Oct. 28, 2005.
Google Toolbar; "Revision History"; http:www.google.com/support/toolbar/bin/static.py?page=version_info.html; Dec. 11, 2000.
Clarifying Search: A User-Interface Framework for Text Searches. Http://www.dlib.org/dlib/january97/retrieval/01shneiderman.html.
Free Microsoft Office Information Bridge Framework. Http://www.microsoft.com/industry/government/InformationBridge.mspx.
Usability for component Based Portals. http://www.128.ibm.com/developerworks/web/library/us-portal.
OA Dated Jun. 26, 2008 for U.S. Appl. No. 11/367,292, 35 pages.
OA Dated May 13, 2008 for U.S. Appl. No. 11/294,265, 27 pages.
OA Dated Jun. 30, 2008 for U.S. Appl. No. 11/270,407, 33 pages.

* cited by examiner

ADAPTIVE TASK FRAMEWORK

CROSS-REFERENCE TO RELATED APPLICATIONS

This application is related to co-pending U.S. patent application Ser. No. 11/270,407, filed Nov. 9, 2005, and entitled, "ADAPTIVE TASK FRAMEWORK". The entirety of the aforementioned application is hereby incorporated by reference.

BACKGROUND

Human languages are rich and complicated, including huge vocabularies with complex grammar and contextual meaning. Machine interpretation of human language, even in a very limited way, is an extremely complex task and continues to be the subject of extensive research. Providing users with the ability to communicate their desires to an automated system without requiring users to learn a machine specific language or grammar would decrease learning costs and greatly improve system usability. However, users become quickly frustrated when automated systems and machines are unable to interpret user input correctly, resulting in unexpected results.

Natural language input can be useful for a wide variety of applications, including virtually every software application with which humans are intended to interact. Typically, during natural language processing the natural language input is separated into tokens and mapped to one or more actions provided by the software application. Each application can have a unique set of actions. Consequently, it can be both time-consuming and repetitive for software developers to draft code to interpret natural language input and map the input to the appropriate action for each application.

There is a need for a method or system that provides software developers with a standardized framework for adding a natural language interface to a software application. In addition, there is a need for natural language interface that learns or adapts based upon user input and actions.

SUMMARY

The following presents a simplified summary in order to provide a basic understanding of some aspects of the claimed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the provided subject matter concerns systems and methods for supporting natural language processing in which natural language input is mapped to a task. The system includes a task interface for defining a task, the associated data and the manner in which task data is interpreted. Furthermore, the system provides a framework that manages tasks to facilitate natural language processing. The task interface and framework can be used to provide natural language processing capabilities to third party applications. Additionally, the task framework can learn or be trained based upon feedback received from the third party applications.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

Figure 1:
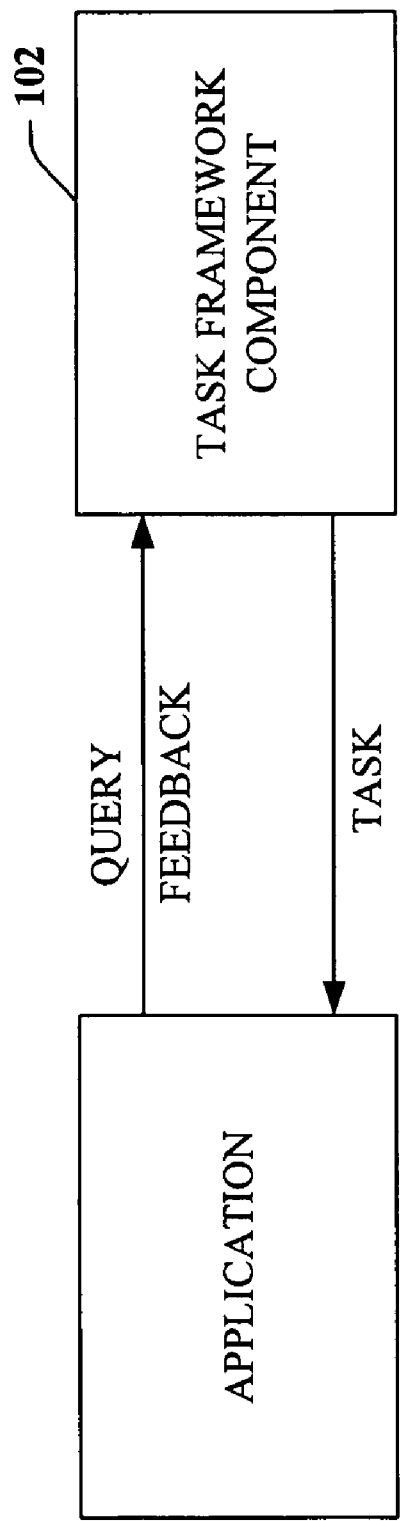
FIG. 1 illustrates an application utilizing a natural language processor in accordance with an aspect of the disclosed subject matter.

The various aspects of the subject invention are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents and alternatives falling within the spirit and scope of the claimed subject matter.

As used herein, the terms "component," "system" and the like are intended to refer to a computer-related entity, either hardware, a combination of hardware and software, software, or software in execution. For example, a component may be, but is not limited to being, a process running on a processor, a processor, an object, an executable, a thread of execution, a program and/or a computer. By way of illustration, both an application running on computer and the computer can be a component. One or more components may reside within a process and/or thread of execution and a component may be localized on one computer and/or distributed between two or more computers.

The word "exemplary" is used herein to mean serving as an example, instance or illustration. Any aspect or design described herein as "exemplary" is not necessarily to be construed as preferred or advantageous over other aspects or designs. In addition, while the examples provided utilize the C# and extended markup language (XML) programming languages, numerous alternative programming languages may be used.

Furthermore, the disclosed subject matter may be implemented as a system, method, apparatus or article of manufacture using standard programming and/or engineering techniques to produce software, firmware, hardware, or any combination thereof to control a computer or processor based device to implement aspects detailed herein. The term "article of manufacture" (or alternatively, "computer program product") as used herein is intended to encompass a computer program accessible from any computer-readable device, carrier or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

In general, semantic analysis attempts to match natural language input to certain tasks or actions provided by an automated system. Typically, semantic processing breaks the natural language input into strings of characters called tokens. The automated system can analyze the tokens as well as the user context to determine the appropriate task. The user context may include any information that indicates the user's current state, such as recent user actions, any software applications active on the user's computer or any other information indicative of the user's state.

A task may require information from the natural language input. Frequently, tasks include slots that provide information about how to conduct the task. For example, an airline reservation system can include a "Book Flight" task, where the Book Flight task includes slots for the arrival and departure cities, the arrival and departure dates and the number of passengers. The information required for those task slots can be retrieved from a natural language input (e.g., "I want a flight from Boston to Seattle with 2 passengers leaving on May 8, 2005 and returning on May 25, 2005"). In another example, a word processing application can include a "Create Table" task having slots for the number of rows and columns and a line style. Those slots can receive values from the natural language input (e.g., "Insert a 2 by 4 table with dotted lines"). A task slot is a holder for piece of data or information that may be retrieved from the natural language input.

Determining possible mappings from natural language input to the appropriate task slots is a complex problem that may be solved using a variety of different mathematical techniques. Conventional techniques include Hidden Markov Models (HMM), Maximum Entropy/Minimum Divergence Models (MEMD), Naïve Bayes (NB), and Heuristic (i.e. rule-based) approaches. Many techniques utilize a searching or decoding strategy (e.g., a Viterbi search, Beam search, A* search or other algorithm) to determine the best solution out of a set of possible solutions.

I. System Overview

FIG. 1 illustrates an application 100 utilizing a task framework component 102 in accordance with an aspect of the disclosed subject matter. The task framework component 102 can be a platform that provides the application 100 with a standardized method for interpreting natural language input. The task framework component 102 can provide application developers with a standard manner of defining the tasks the application or system is capable of performing. A task, as used herein, describes and defines a fundamental unit of action relevant to user. The task framework component 102 enables the application 100 to define and manage tasks. This standardization simplifies and speeds application development.

The application 100 can receive any manner of natural language input (e.g., handwritten text, tablet input, speech and typed text). The application 100 can process the natural language input to generate a query for processing by the task framework component 102. The query can be a simple string of text characters. The task framework component 102 selects one or more application tasks based, at least in part, upon the query. The task framework component 102 can provide the task with input data from the query and return the task to the application for execution.

In addition, the task framework component 102 can be trained to improve performance. Such performance can be enhanced by employing feedback to adjust ranking algorithms in one example to better match what users actually want from natural language systems or components. The task framework component 102 can receive feedback from the application 100. This feedback can include explicit feedback, such as user responses or reactions to the interpretation(s) of the natural language input or implicit feedback, such as the actions selected by users. The task framework component 102 can utilize any algorithm to improve interpretation of the natural language input (e.g., Hidden Markov Models (HMM), Maximum Entropy/Minimum Divergence Models (MEMD), Naïve Bayes (NB) and Heuristic (i.e. rule-based) approaches).

The task framework component 102 can be used with a variety of applications. For example, a telephone speech server, operating or application systems assistance, web services (e.g., airline reservations, online shopping and event tickets) and mobile devices (e.g., email, contacts and phone).

Possible implementations of a natural language processing system are described in detail below. The exemplary software code presented below is coded in the C# programming language. However, the natural language processing system and methods are not limited to the C# language. Any suitable programming language or method may be utilized to implement the natural language processing system.

II. Task Interface

Figure 2:
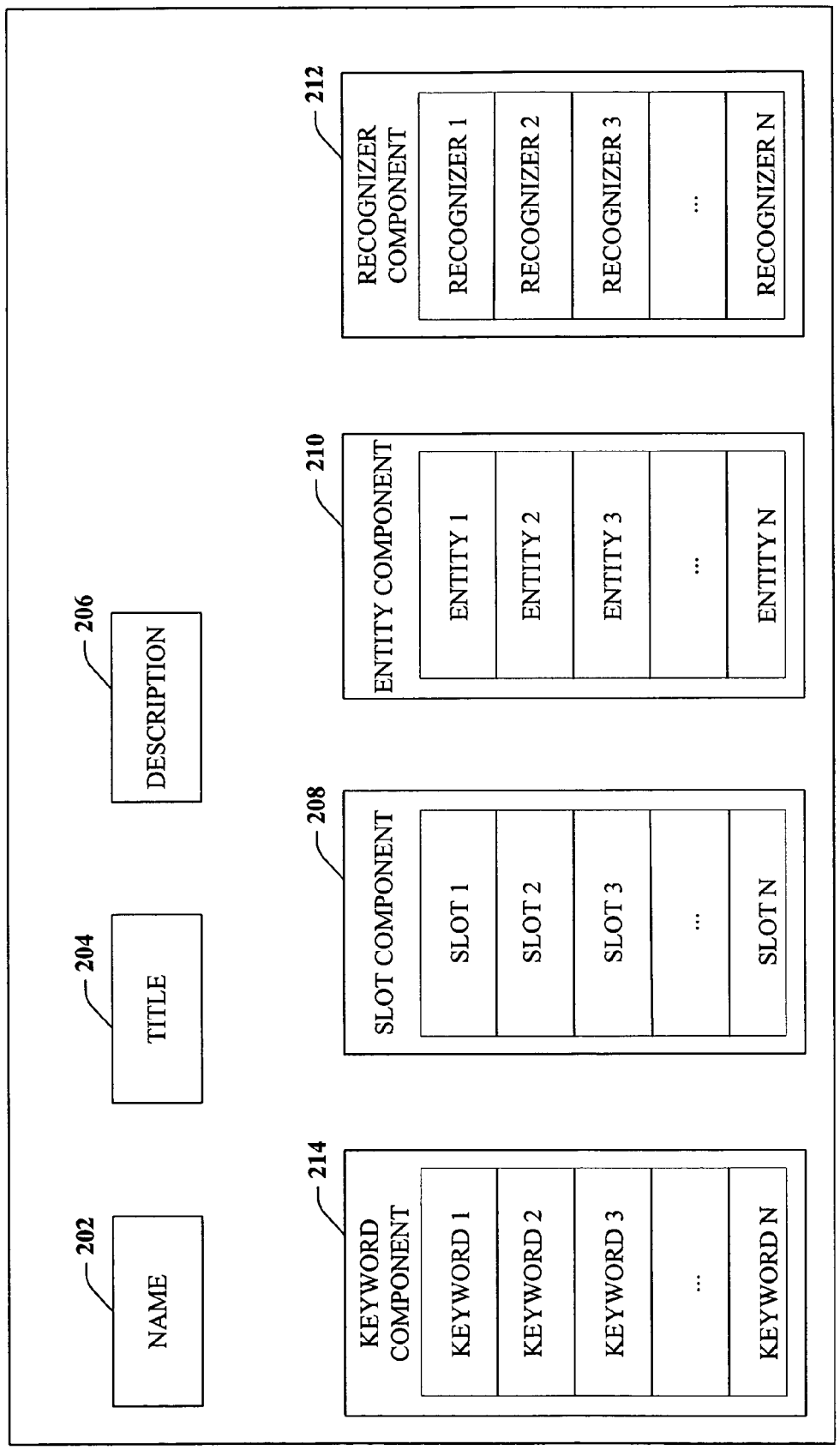
FIG. 2 illustrates a task component in accordance with an aspect of the disclosed subject matter.

Referring, now to FIG. 2, the system provides a standard task interface. The task interface can handle most of the data exchange between the system and one or more applications. The task interface can provide software developers with a standardized system for defining tasks performed by the system. FIG. 2 illustrates a task component 200 in accordance with an aspect of the disclosed subject matter. The task component can include metadata about the task. For example, the task component 200 can include a name 202 that identifies (e.g., a task for booking airline flights may be named "BookFlight"). The task component 200 metadata can also include a title 204 that can be displayed to users. Additionally, the task component 200 can include a description 206 that briefly describes the task. The description can be displayed to users either to allow the users to select the appropriate task or confirm that the appropriate task has been selected. The name, title and description can be implemented using alphanumeric text strings.

The task component 200 can include an entity component 210. The entity component can include one or more named entities. A named entity, as used herein, is a token that is known to have a specific meaning. The named entity can be task specific or can be utilized with multiple tasks. The task component can include a named entity (NE) recognizer component 212. The NE recognizer component can include one or more recognizers capable of matching tokens or portions of the natural language input to the entities included in the entity component 210. The NE recognizers are capable of recognizing tokens corresponding to the named entities contained within the entities component 210. These tokens have a specific task meaning. Recognizers may be general or may be specific to a certain category of tokens. For example, a city recognizer may include a list of names (e.g., Seattle, Boston). Similarly, a date recognizer may be capable of recognizing and interpreting dates, such as "Jun. 14, 2005." The software developer may define certain recognizers when specifying a task.

The task component 200 can also include a keyword component 214. The keyword component 214 can include one or more keywords. Keywords can be used to select a task from a set of tasks. For example, the "BookFlight" task keyword component 214 can include keywords such as "Book Flight," "airline" and the like. The keywords can be determine by the software developer or automatically generated by the task framework. In addition, the task framework can add additional keywords to the keyword component based upon natural language input, user actions and/or user feedback. Furthermore, the keywords may be weighted, such that the presence of certain keywords in the query is more likely to surface certain tasks. Such weight can also be used to rank or order a selected group of tasks.

The task component 200 can also include a slot component 208 that specifies or defines slots for information required for the task. The slot component 208 can provide a mechanism for defining parameters used by the task. For example, a task that books airline flights may include slots for the arrival city, the departure city, the flight date and time. The slot component 208 can include any integer number of slots, from zero to N. Typically, information from the natural language input is used to fill the slots.

Figure 3:
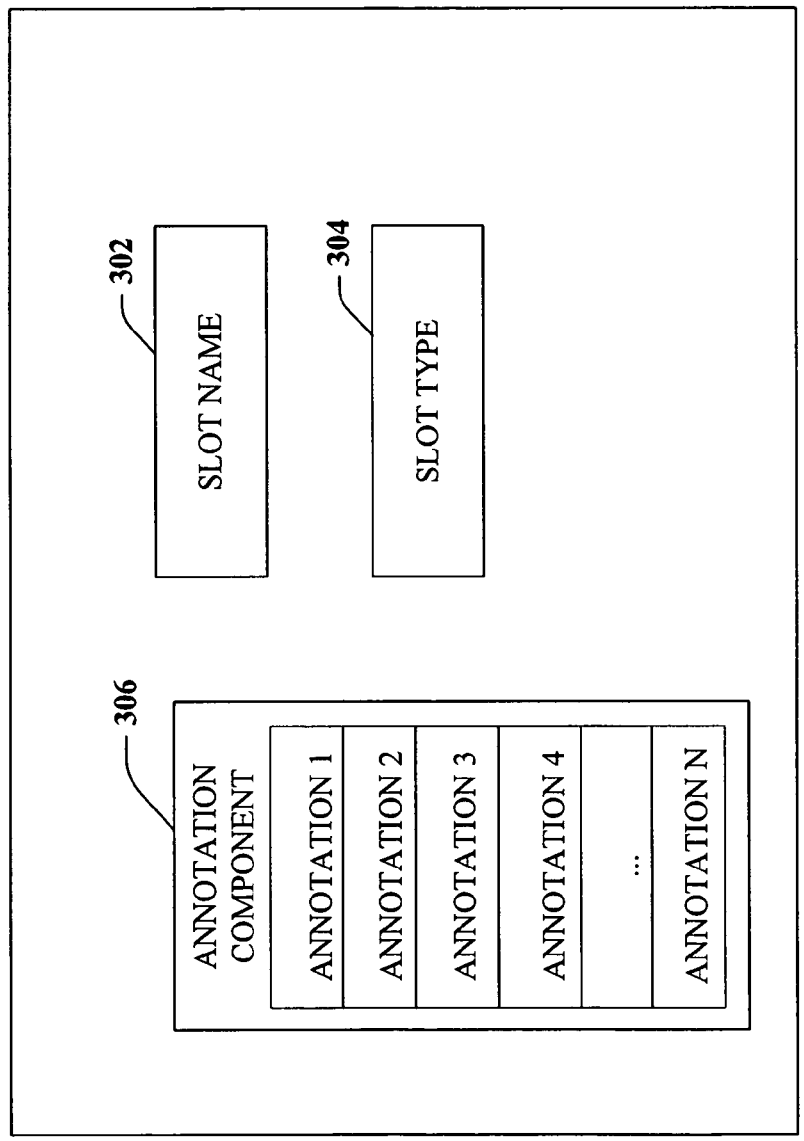
FIG. 3 illustrates a slot component in accordance with an aspect of the disclosed subject matter.

FIG. 3 illustrates a slot component 300 in accordance with an aspect of the subject matter presented herein. A slot component 300 can include a slot name 302 that identifies the slot. For example, the BookFlight task discussed above can include slots named "DestinationCity," "ArrivalCity" and "Date." The slot component can also include a slot type 304. Slot type 304 indicates the type of the value of the slot data. Types can include integers, real numbers, textual strings and enumerated types (e.g., type "City" can include a list of city names).

The slot component 300 can also include an annotation component 306. The annotation component 306 can include one or more annotations. Annotations are tokens that mark or indicate the significance of other tokens. The annotation component 306 identifies an annotation token and uses that information to interpret other tokens within the natural language input. For example, the token "from" when contained within a natural language input string that maps to a "BookFlight" task indicates that the token that follows is likely to contain the name of the departure city. Annotations may appear either before or after the relevant token. For example, the token "departure city" when contained within a natural language input string that maps to a "BookFlight" task indicates that the token that precedes it is likely to contain the name of the departure city. Consequently, the phrase "leaving from Boston" and "Boston departure city" can both be interpreted to fill the departure city slot with the value "Boston." Annotations which appear before the token are called pre-indicators, while annotations which follow the relevant token are called post-indicators. The annotation component 306 can recognize task system defined annotations as well as task specific annotations.

The task component or task interface can provide software developers with a tool to define the actions available by their applications. Software developers can use this interface to define the tasks provided by their applications. This tool can provide a standard interface, decreasing the software development cycle time. Either alternatively or in addition, task components can be generated automatically by the task framework. The task framework can utilize user actions and feedback to generate task components or interfaces. Additionally, the framework can use user actions and/or feedback to modify task interfaces generated either by the framework, an application or by a software developer. Consider the following exemplary task interface:

```
public interface ITask
{
    string Name {get;}
    string Title {get;}
    string Description {get;}
    IList Keywords {get;}
    IList Slots {get;}
    IList Entities {get;}
    IList Recognizers {get;}
    string Restatement(ISemanticSolution semanticSolution);
    void Execute(ISemanticSolution semanticSolution);
}
```

Here, the task interface includes Name, Title and Description properties. Each of which is defined as a string. The task interface also includes separate list properties for Keywords, Slots, Entities and Recognizers. The task interface can also include a Restatement method and an Execute method. A restatement can be a restating of the task that allows users to view the task in an easy format. For example, for the query "I want a flight to Boston" a valid restatement or interpretation of the input query might be "book flights to Boston." The restatement can be provided to assist users in selecting between possible tasks or confirm that the selected task meets the users' expectations. The restatement can be a simple text string, an image, audio output or any other suitable medium. The restatement function can be implemented in the task system rather than in the task itself, using annotations on the slots or tasks The execution method actually executes the task. This method may be triggered based upon user action.

Task interfaces may be defined using extended markup language (XML), databases, text files or in any other suitable manner. Software developers can define task interfaces such as the BookFlight task. Consider the following exemplary task interface:

```
<Task Name="BookFlight" Title= "Book Flights" Description="Find
    great
deals on vacations!">
    <Keywords>cheap;tickets;flights;flight;vacations</Keywords>
    <Slots>
        <Slot name="Arrival City" type= "CITY">
            <PreIndicators>to, going into</PreIndicators>
            <PostIndicators>arrival city</PostIndicators>
        </Slot>
        <Slot name="Departure City" type= "CITY">
            <PreIndicators>from, originating in</PreIndicators>
            <PostIndicators>departure city</PostIndicators>
```

```
        </Slot>
        <Slot name="Arrival Time" type="TIME">
            <PreIndicators>arriving at</PreIndicators>
            <PostIndicators>arrival time</PostIndicators>
        </Slot>
        <Slot name=" Departure Time" type="TIME">
            <PreIndicators>leaving at</PreIndicators>
            <PostIndicators>departure time</PostIndicators>
        </Slot>
    </Slots>
</Task>
```

The first line includes the task metadata, including the name, title and description. Next, the task defines the keywords that can be used to locate the task from a collection of tasks. The task includes four separate slots, "Arrival City," "Departure City," "Arrival Time" and "Departure Time." Each of the slots includes one or more annotations. For example, the "Arrival City" slot includes a list of Preindicators "to, going int" and a list of Postindicators "arrival city." The presence of any of those annotations in the natural language input will indicate the presence of the value for the Arrival City slot. A query such as "I want a flight from Boston with an 8:30 departure time" containing the keyword "flight" should retrieve the "BookFlight" task.

Consider the following additional exemplary task interface for creating a table, such as might be used to create and insert a new table in a word-processing document:

```
<Task Name="CreateTable" Title="Create a new table"
Description="Insert a
table into your current document">
    <Keywords>create,table,insert,grid</Keywords>
    <Slots>
        <Slot Name="Rows" Type="Integer">
            <PreAnnotations>by</PreAnnotations>
            <PostAnnotations>rows</PostAnnotations>
        </Slot>
        <Slot Name="Columns" Type="Integer">
            <PreAnnotations />
            <PostAnnotations>columns,by</PostAnnotations>
        </Slot>
        <Slot Name="LineStyle" Type="LineStyle">
            <PreAnnotations />
            <PostAnnotations />
        </Slot>
    </Slots>
    <Entities>
        <Entity Name="LineStyle" Base="" />
    </Entities>
    <NamedEntityRecognizers>
        <NamedEntityRecognizer Name="LineStyle">
            <Annotations>solid,dotted,dashed</Annotations>
        </NamedEntityRecognizer>
    </NamedEntityRecognizers>
</Task>
```

Here, a task to create a table is defined. The first two lines include the task metadata, including the name, title and description. Next the task defines the keywords (e.g., create, table, insert, grid) that can be used to locate the task from a collection of tasks. The task includes three separate slots "Rows," "Columns" and "LineStyle." The Rows and Columns slots are of the integer type, provided by the system. The LineStyle type can be supplied by the task. The task also includes entities and entity recognizers. The entities include the LineStyle. The NamedEntityRecognizer includes several annotations (e.g., solid, dotted and dashed).

III. Task Framework

The system can provide a framework that uses an interface, such as the task interface, to provide a standard, consistent architecture for natural language processing. As shown in FIG. 1, the task framework component receives a query or queries from an application and passes back one or more tasks to the application. Each task is self-contained and is responsible for its execution. The framework can be independent of the manner in which the task is executed. Consequently, the framework can be used for a variety of applications (e.g., speech, assistance, web services and other applications). The query can be a text string from the natural language input, in which case the query can be tokenized or separated into individual words or groups of words. Alternatively, the natural language input can be tokenized prior to being passed to the task framework component.

Figure 4:
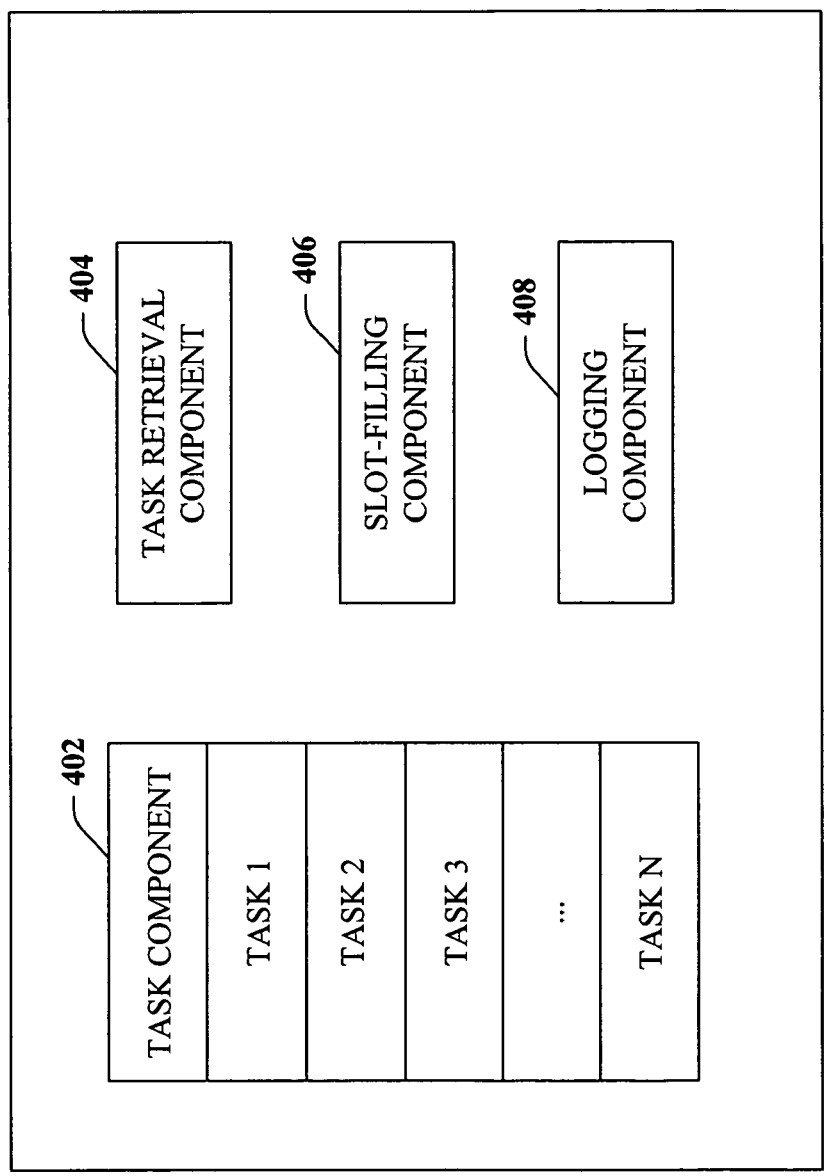
FIG. 4 illustrates a task platform in accordance with an aspect of the disclosed subject matter.

FIG. 4 illustrates a task framework or system 400 in accordance with an aspect of the disclosed subject matter. The system can include a task component 402 that includes any number of tasks. The tasks can be described using the task interface described in detail above. Tasks can be generated by one or more applications or tasks can be generated automatically by the task framework 400. In addition, the task framework 400 may update or modify tasks generated by the application. The task component 402 can be a flat file, a database or any other structure suitable for containing the data for one or more tasks.

The task framework 400 can include a task retrieval component 404. The task retrieval component 404 uses the query to select one or more tasks from the collection of tasks contained within the task component 402. The task retrieval component 404 may determine the appropriate task to be retrieved from the task component 402 based upon keywords in the query. The collection of tasks in the task component 402 can be indexed based upon the task keywords. The tokens contained within the query can be used to select an appropriate task or set of tasks. The application can also include additional information with the query. For example, the application could pass user context information to the framework to be used in the selection of the appropriate task. The task retrieval component 404 can use a variety of methodologies to select appropriate tasks. The task retrieval component 404 can be trained to improve performance based upon user actions and responses to the selected tasks.

In addition, the task framework 400 can include a slot-filling component 406. The slot-filling component can be responsible for providing the best matching of the list of tokens from the natural language input or query with the task parameters. Typically, a slot-filling component can receive a list of tokens and one or more tasks. The slot-filling component can generate one or more possible mappings of the tokens to the slots of the task. The slot-filling component can generate a score or rank for each of the possible mappings of tokens to task slots. The slot-filling component 406 can use a mathematical model, algorithm or function to calculate a score or rank for mappings. The slot-filling component can utilize a heuristic function, a hidden Markov model, a Naïve Bayes based model, Maximum Entropy/Minimum Divergence Models (MEMD), blending strategies, linear discriminative models or any combination thereof to calculate a score for a mapping of tokens to a task.

The slot-filling component can include a method responsible for taking the natural language input, culture information, a list of tokens, a list of named entities, a task and a predetermined maximum number of desired solutions. Culture information can include information such as the writing system and formatting utilized by the relevant culture. Named entities identify tokens with a specific meaning to the slot-filling system (e.g., Boston). The slot-filling component can produce a list of up to the maximum number of requested semantic solutions.

A semantic solution is a representation of a mapping of tokens to slots that can be used by applications. In addition, the semantic solution can be more easily read by a user than the raw path data and may be presented to the user for verification. The semantic solution can be presented to users either as simple text or in a graphics display highlighting the semantic structure. A hierarchical, tree structure representation may assist users in recognizing interpretations of natural language input. Consider the following exemplary semantic solution for the query "I want a flight from Boston leaving on 10/23/05" for the "BookFlight" task:

```
<SemanticSolution Input="I want a flight from Boston leaving on
10/23/05"
Score="3.808E-06">
    <SemanticConditions>
        <SemanticCondition SlotName="Departure" SlotType=" City">
            <SemanticValues>
                <SemanticValue Type="City" Value="Boston"/>
            </SemanticValues>
        </SemanticCondition>
        <SemanticCondition SlotName="Arrival" SlotType="Date">
            <SemanticValues>
                <SemanticValue Type="Date" Value="10/23/05"/>
            </SemanticValues>
        </SemanticCondition>
    </SemanticConditions>
</SemanticSolution>
```

Here, the semantic solution includes the natural language input as well as a score that can be used to rank semantic solutions. The semantic solution includes a departure slot and an arrival slot. The departure slot contains a city type value of "Boston" and the arrival slot contains a date type value of "10/23/05." Consider the additional exemplary semantic solution for the query "create a 2 by 4 table with dashed lines" for the "CreateTable" task:

```
<SemanticSolution Input="2 by 4 dashed" Score="0.22407">
    <SemanticConditions>
        <SemanticCondition SlotName="Columns"
        SlotType="Integer">
            <SemanticValues>
                <SemanticValue Type="Integer" Value="2"/>
            </SemanticValues>
        </SemanticCondition>
        <SemanticCondition SlotName="Rows"
        SlotType="Integer">
            <SemanticValues>
                <SemanticValue Type="Integer" Value="4"/>
            </SemanticValues>
        </SemanticCondition>
        <SemanticCondition SlotName="LineStyle"
        SlotType="LineStyle">
            <Semantic Values>
                <SemanticValue Type="LineStyle"
                Value="dashed"/>
            </SemanticValues>
        </SemanticCondition>
    </SemanticConditions>
</SemanticSolution>
```

Here, the semantic solution includes a columns slot, a rows slot and a LineStyle slot. The columns slot contains an integer value "2", the rows slot contains an integer value "4," and the LineStyle slot contains a LineStyle type value of "dashed." For tasks that have not implemented any slots, the semantic solution will contain no semantic condition elements.

The task framework 400 can also include a logging component 408. Tasks can pass information or feedback to the task framework after completion of the task or during task processing. The logging component 408 stores the feedback information. This information can be used to train the task framework 400 and improve system performance. The feedback from tasks can include user actions. The task framework can include a defined intent interface to facilitate feedback. Consider the following exemplary feedback interface, referred to as the intent interface:

```
public interface IIntent
{
    string Query {get;}
    IList IntentConditions {get;}
    string Xml {get;}
    string TaskName {get;}
}
```

The interface can include the query input from the application, a task name and a list of IntentConditions that correspond to the task slots. The intent conditions, or task slots, can be implemented as follows:

```
public interface IIntentCondition
{
    string SlotName {get;}
    string SlotType {get;}
    string SlotValue {get;}
}
```

The interface specifying the slots can include the name of the slot, the type of slot (e.g., integer, string or enumerated type) and a value for the slot.

The intent interface can include sufficient information to train the task retrieval component 404 and the slot-filling component 406. The interface provides a simple mechanism for applications and tasks to pass feedback to the task framework. Connectors such as "and" or "or" and modifiers, such as "less than" or "not" can be ignored for the purposes of the intent interface to maintain simplicity for application developers, however it is to be appreciated that these connectors can be added back into the interface without deviating from the intended use of the interface.

In addition, the task framework or the slot-filling component can include one or more GlobalRecognizers that provide the ability to recognize tokens that have special meaning to the task system in general. For example, the token "Boston" has special meaning as the city of Boston, Mass. The GlobalRecognizers property provides a set of recognizer components that identify special tokens, making them available throughout the entire system and across multiple tasks. For example, there may be several tasks that utilize "city," "date" or "number" entities. Entities are a mechanism for providing type information. For example, the "city" entity includes a set of annotations (e.g., "city," "place," and "town"). Occurrences of the annotations within the list of tokens indicate the likelihood of a "city" entity. GlobalRecognizers allows such entities or special tokens to be defined once rather than for each individual task.

Figure 5:
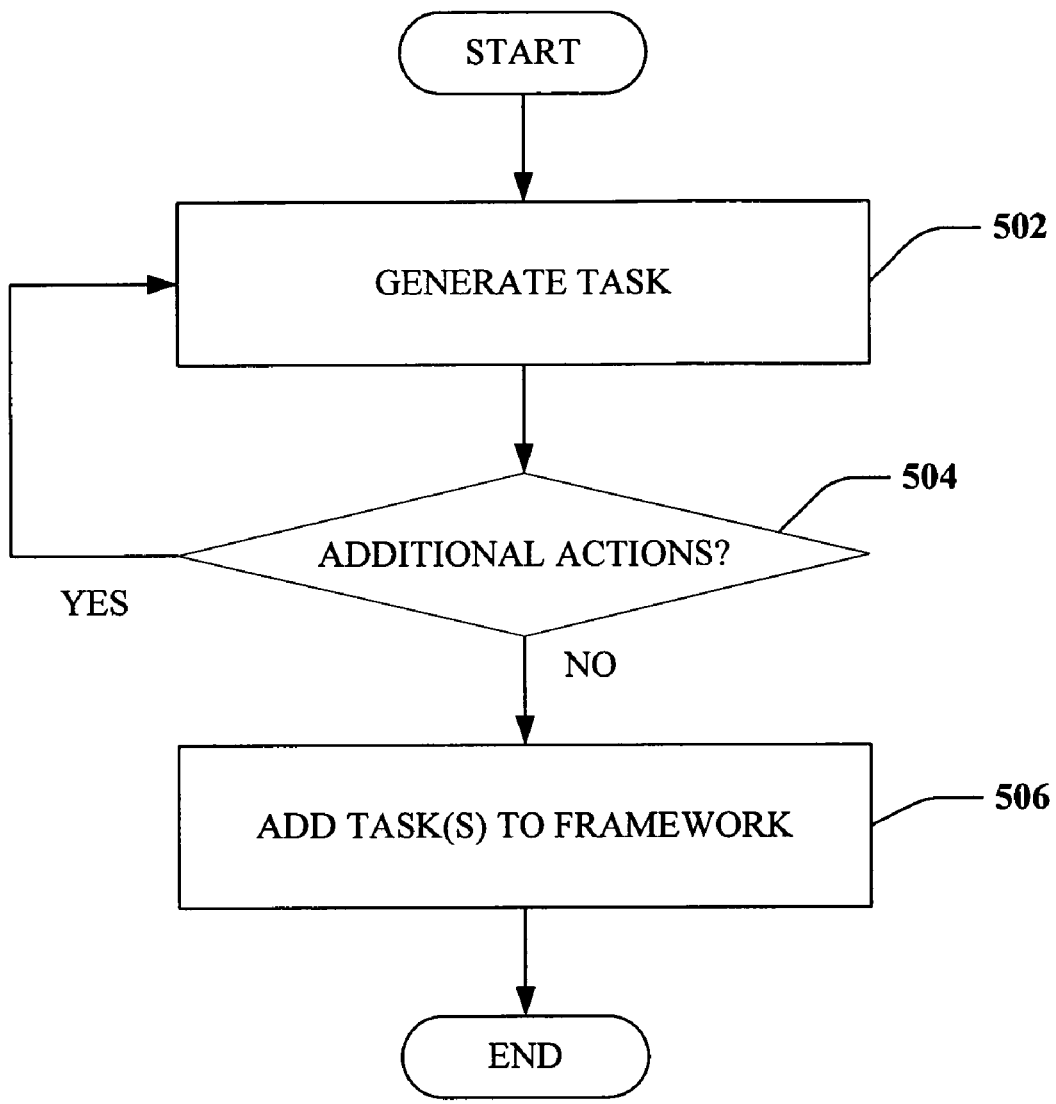
FIG. 5 is an illustration of a methodology for initializing a task framework in accordance with the disclosed subject matter.

FIG. 5 illustrates a methodology 500 for initializing a task framework in accordance with the disclosed subject matter. At 502, the application developer creates a task corresponding to an application action in accordance with the task interface. At 504, it is determined whether the application includes additional actions for which tasks should be generated. If yes, a new task corresponding to an application action is generated at 502. If no, the generated task or tasks are added to the task framework at 506. Alternatively, tasks can be added to the task framework as they are generated.

Figure 6:
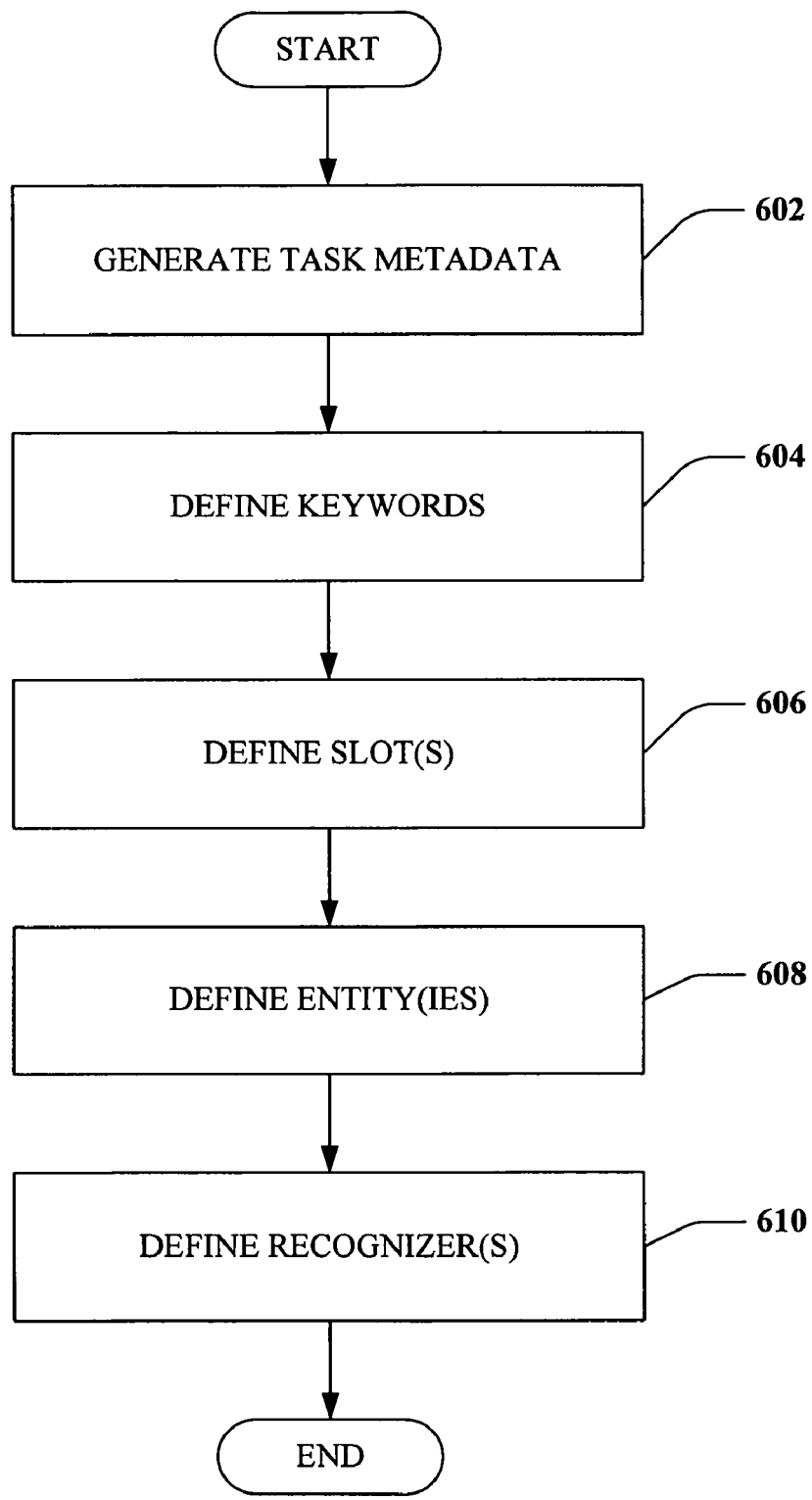
FIG. 6 is an illustration of a methodology for generating a task in accordance with the disclosed subject matter.

FIG. 6 illustrates a methodology 600 for generating a task in accordance with the disclosed subject matter. At 602, task metadata can be generated. Task metadata can include a task name, task title and description. Keywords for the task can be defined at 604. Slot can be defined at 606. At 608, any entities relevant to the task can be defined. Entities can include general, global entities as well as entities specific to the particular task. At 610, any relevant recognizers can be defined or selected for a set or library of recognizers.

Figure 7:
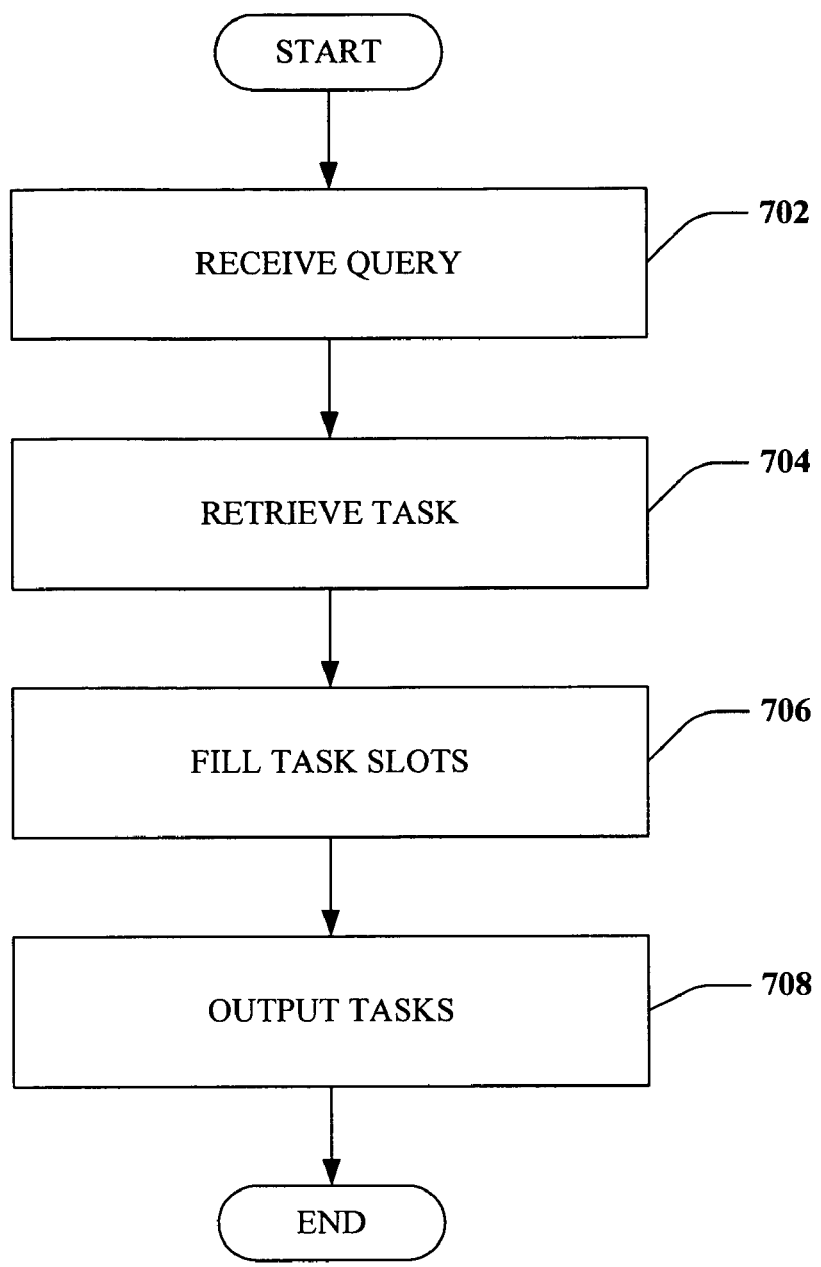
FIG. 7 is an illustration of a methodology for processing natural language input in accordance with the disclosed subject matter.

FIG. 7 illustrates a methodology 700 for processing natural language input or queries in accordance with the disclosed subject matter. At 702, a query is received. The query can include a text string, a set of tokens or data in any other suitable format. If the query includes a string, it may be separated into tokens. At 704, one or more tasks are selected. The task or tasks can be selected based upon the data within the query. For example, the tokens of the query can be compared to keywords of the tasks. Tasks, which include keywords that match or are related to the tokens of the query, can be selected. The tasks may be ranked based upon the keywords that match the tokens. The tokens from the query can be mapped to the slots of the task or tasks at 706. The mapping of the tokens can include generating a score or ranking for the different mappings. The tasks or tasks are output at 708.

Figure 8:
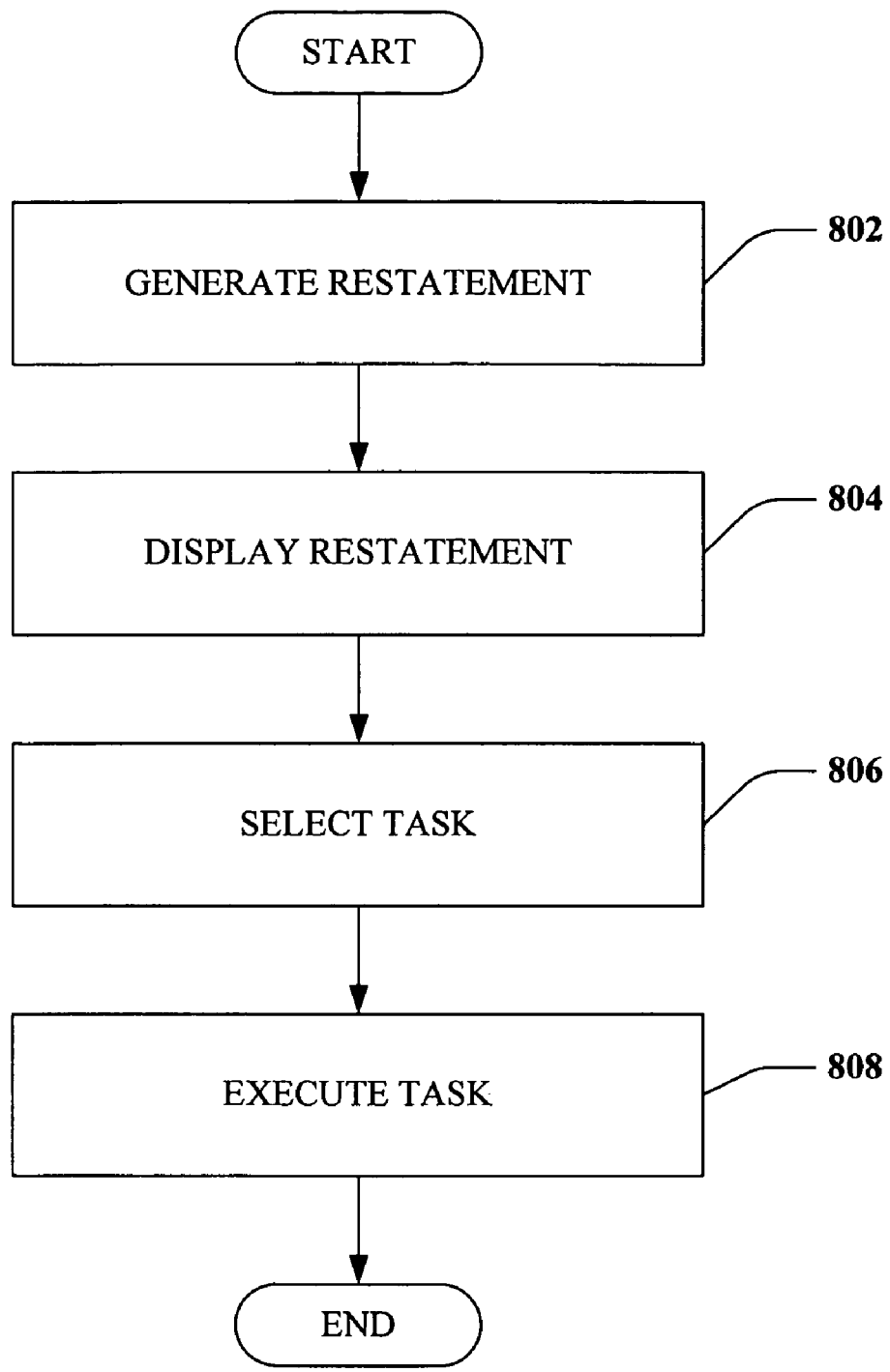
FIG. 8 is an illustration of a methodology for selecting the appropriate action based upon user input in accordance with the disclosed subject matter.

FIG. 8 illustrates a methodology 800 for selecting the appropriate action based upon user input in accordance with the disclosed subject matter. At 802, a restatement is generated for the task. The restatement can be displayed at 804. As used herein, display includes visual presentation as well as any other suitable audio or visual method of presentation. The appropriate task can be selected based upon the restatement at 806. At 808, the task executes. Alternatively, the task could execute automatically without requiring selection.

Figure 9:
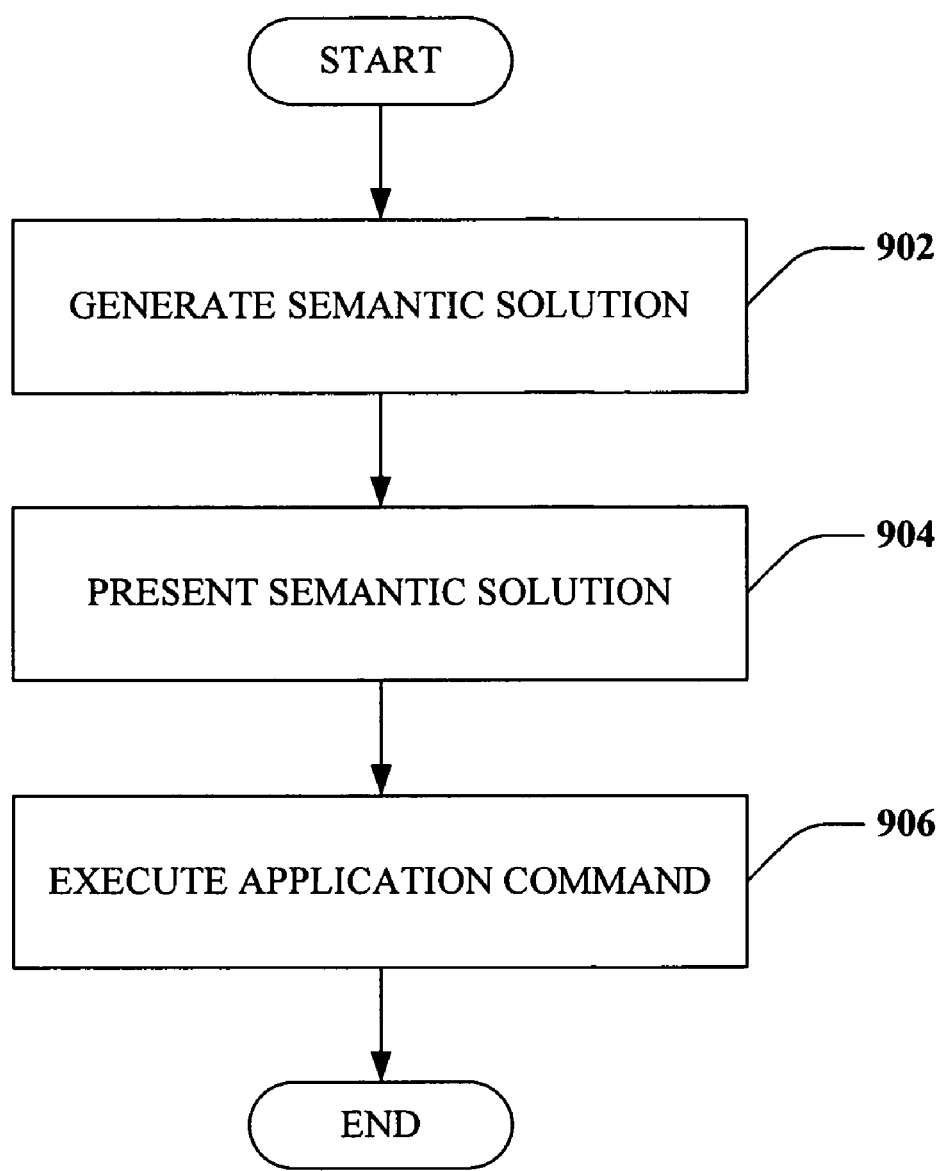
FIG. 9 is an illustration of a methodology for task execution in accordance with the disclosed subject matter.

FIG. 9 illustrates a methodology 900 for task execution in accordance with the disclosed subject matter. At 902, the selected task is executed. A semantic solution is generated and presented to the application at 904. The appropriate application command is executed based upon the semantic solution at 906.

Figure 10:
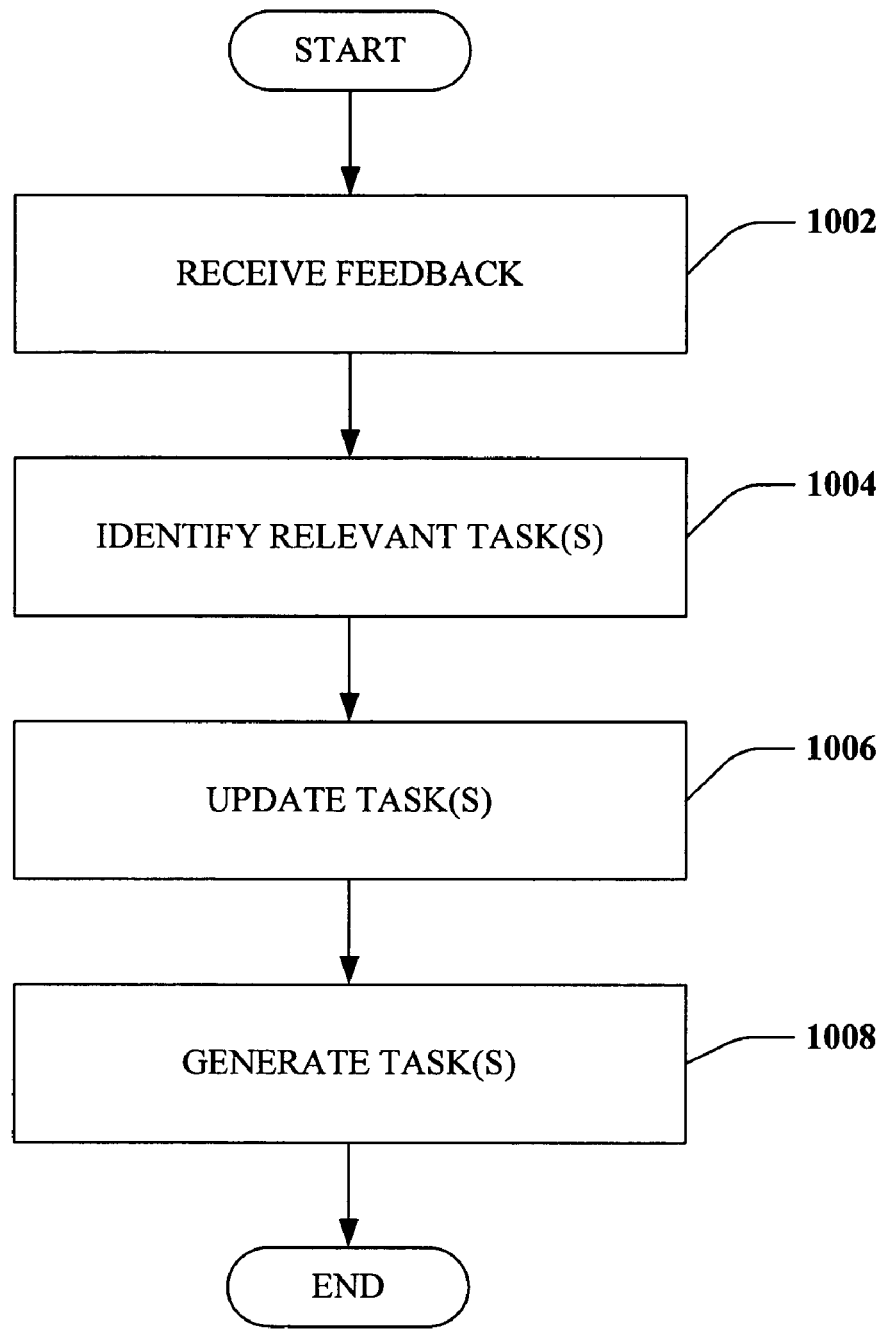
FIG. 10 is an illustration of a methodology for improving task processing based upon user feedback in accordance with the disclosed subject matter.

FIG. 10 illustrates a methodology 1000 for improving task processing based upon user feedback in accordance with the disclosed subject matter. At 1000, user feedback is received. The user feedback can include explicit feedback such as rankings or ratings of mapping results or implicit feedback based upon user actions. The task or tasks to which the user feedback applies are identified at 1002. The identified task or tasks can then be updated or modified 1004 based upon the provided user feedback. A variety of algorithms or models can be used to adjust or modify the task framework. In addition, new tasks can be generated based upon the user actions at 1006.

The aforementioned systems have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Additionally, it should be noted that one or more components may be combined into a single component providing aggregate functionality or divided into several sub-components. The components may also interact with one or more other components not specifically described herein but known by those of skill in the art.

Furthermore, as will be appreciated various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent.

In view of the exemplary systems described supra, methodologies that may be implemented in accordance with the disclosed subject matter will be better appreciated with reference to the flowcharts of FIGS. 5-10. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

Additionally, it should be further appreciated that the methodologies disclosed hereinafter and throughout this specification are capable of being stored on an article of manufacture to facilitate transporting and transferring such methodologies to computers. The term article of manufacture, as used, is intended to encompass a computer program accessible from any computer-readable device, carrier, or media.

Figure 11:
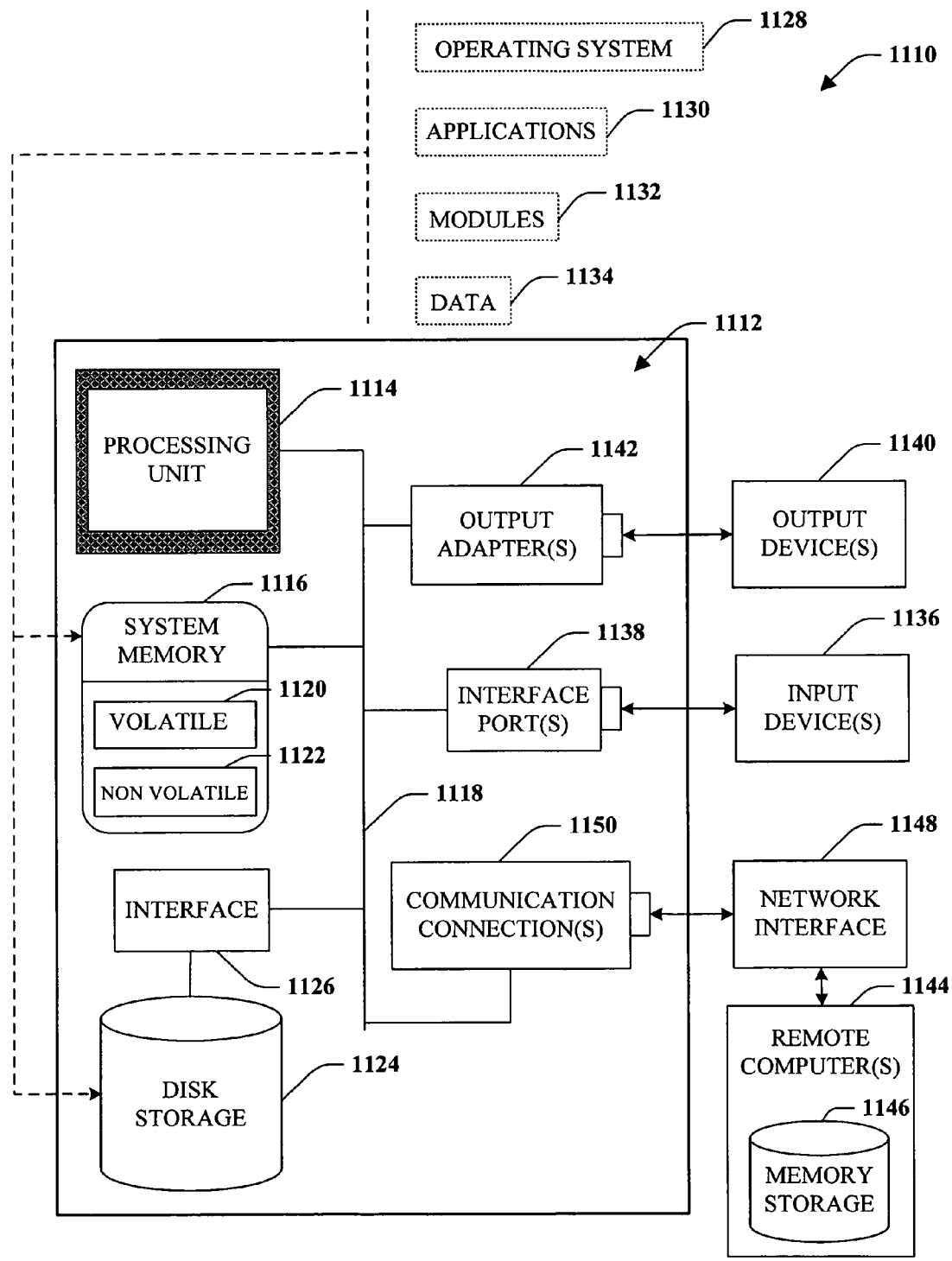
FIG. 11 is a schematic block diagram illustrating a suitable operating environment.
Figure 12:
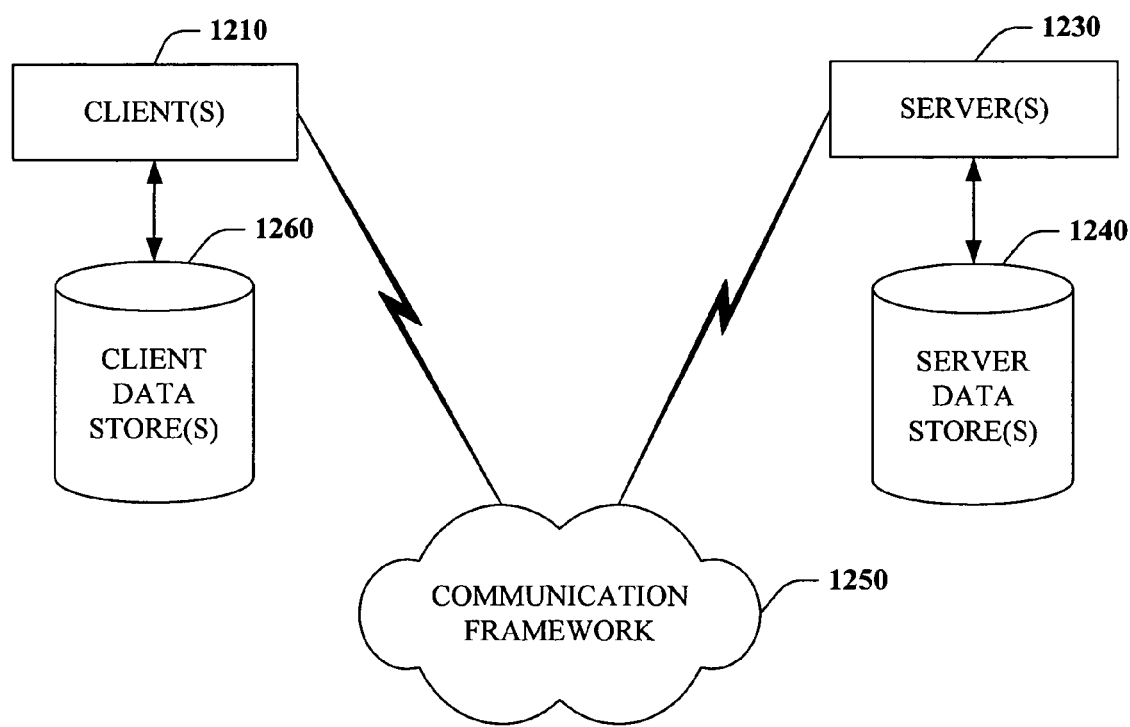
FIG. 12 is a schematic block diagram of a sample-computing environment.

In order to provide a context for the various aspects of the disclosed subject matter, FIGS. 11 and 12 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the invention also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the invention can be practiced on stand-alone computers. In a distributed computing environment, program modules may be located in both local and remote memory storage devices.

With reference to FIG. 11, an exemplary environment 1110 for implementing various aspects disclosed herein includes a computer 1112 (e.g., desktop, laptop, server, hand held, programmable consumer or industrial electronics . . . ). The computer 1112 includes a processing unit 1114, a system memory 1116, and a system bus 1118. The system bus 1118 couples system components including, but not limited to, the system memory 1116 to the processing unit 1114. The processing unit 1114 can be any of various available microprocessors. Dual microprocessors and other multiprocessor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable ROM (EEPROM), or flash memory. Volatile memory 1120 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1112 also includes removable/non-removable, volatile/non-volatile computer storage media. FIG. 11 illustrates, for example, disk storage 1124. Disk storage 1124 includes, but is not limited to, devices like a magnetic disk drive, floppy disk drive, tape drive, Jaz drive, Zip drive, LS-100 drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used such as interface 1126.

It is to be appreciated that FIG. 11 describes software that acts as an intermediary between users and the basic computer resources described in suitable operating environment 1110. Such software includes an operating system 1128. Operating system 1128, which can be stored on disk storage 1124, acts to control and allocate resources of the computer system 1112. System applications 1130 take advantage of the management of resources by operating system 1128 through program modules 1132 and program data 1134 stored either in system memory 1116 or on disk storage 1124. It is to be appreciated that the present invention can be implemented with various operating systems or combinations of operating systems.

A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port may be used to provide input to computer 1112 and to output information from computer 1112 to an output device 1140. Output adapter 1142 is provided to illustrate that there are some output devices 1140 like displays (e.g., flat panel and CRT), speakers, and printers, among other output devices 1140 that require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection(s) 1150. Network interface 1148 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit-switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems, power modems and DSL modems, ISDN adapters, and Ethernet cards or components.

FIG. 12 is a schematic block diagram of a sample-computing environment 1200 with which the present invention can interact. The system 1200 includes one or more client(s) 1210. The client(s) 1210 can be hardware and/or software (e.g., threads, processes, computing devices). The system 1200 also includes one or more server(s) 1230. Thus, system 1200 can correspond to a two-tier client server model or a multi-tier model (e.g., client, middle tier server, data server), amongst other models. The server(s) 1230 can also be hardware and/or software (e.g., threads, processes, computing devices). One possible communication between a client 1210 and a server 1230 may be in the form of a data packet adapted to be transmitted between two or more computer processes.

The system 1200 includes a communication framework 1250 that can be employed to facilitate communications between the client(s) 1210 and the server(s) 1230. The client(s) 1210 are operably connected to one or more client data store(s) 1260 that can be employed to store information local to the client(s) 1210. Similarly, the server(s) 1230 are operably connected to one or more server data store(s) 1240 that can be employed to store information local to the servers 1230.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" are used in either the detailed description or the claims, such terms are intended to be inclusive in a manner similar to the term "comprising" as "comprising" is interpreted when employed as a transitional word in a claim.

What is claimed is:

1. A task generating method for natural language processing, the task generating method comprising:
   receiving, at a computer, a query from an application, the query comprising natural language input, the natural language input comprising one or more tokens;
   automatically selecting, at the computer, a selected task from a plurality of tasks,
      each task in the plurality of tasks being an action performed by the application in response to particular natural language inputs;
      each task in the plurality of tasks having a standardized interface,
      the standardized interface comprising a keyword component and a slot component,
      the keyword components of different tasks in the plurality of tasks comprising differing sets of keywords,
      the slot components of different tasks in the plurality of tasks comprising different sets of slots, each slot in the set of slots having a slot name and a slot type,
      the keywords in the keyword component of the selected task matching one or more of the tokens;
   automatically generating, at the computer, a semantic solution, the semantic solution mapping slot names of slots in the slot component of the selected task to one or more of the tokens;
   after generating the semantic solution, automatically presenting, by the computer, the semantic solution to the application, the application configured to use the semantic solution to execute the selected task; and
   automatically updating, at the computer, the selected task by modifying at least one of:
      a slot name of a slot in the set of slots in the slot component of the selected task based upon user feedback, and
      a slot type of a slot in the set of slots in the slot component of the selected task based upon user feedback.

2. The task generating method of claim 1,
   wherein the standardized interface further comprises an entity component, the entity components of different tasks in the plurality of tasks comprising one or more different named entities, the named entities being tokens having specific meanings; and
   wherein the standardized interface further comprises a recognizer component, the recognizer components of different tasks comprising different recognizers, the recognizers of the recognizer components of each task in the plurality of tasks identifying, within the natural language input, the one or more named entities of the entity component of the task;
   wherein the method further comprises: automatically identifying, at the computer, the named entities in the natural language input using the recognizers of the recognizer components of each of the tasks; and
   wherein generating the semantic solution comprises: automatically mapping, at the computer, one or more of the named entities to the slot names of slots in the slot component of the selected task.

3. The task generating method of claim 1, further comprising generating, at the computer, a description for the selected task.

4. The task generating method of claim 1, wherein automatically updating the selected task comprises:
   updating, by the computer, at least one of the keywords of the keyword component of the selected task, or
   modifying, by the computer, one or more of the slots of the slot component of the selected task.

5. The task generating method of claim 1, further comprising retrieving, by the computer, the user feedback, the user feedback based in part on a mapping from the query to the selected task.

6. The task generating method of claim 5, further comprising retrieving, by the computer, the user feedback, the user feedback based in part on a mapping from the query to the slots of the slot component of the selected task.

7. The task generating method of claim 5, further comprising:
   updating, by the computer, at least one model based in part on the user feedback; and
   wherein automatically selecting the selected task comprises: using, by the computer, the model to rank the tasks in the plurality of tasks based on matches of the tokens to keywords in the keyword components of the plurality of tasks, the selected task having the greatest rank.

8. A computer readable storage medium having computer readable instructions embodied thereon that execute the operations of the method of claim 1.

9. A computer that can generate one or more tasks, the computer comprising:
   a system memory storing computer-executable instructions; and
   a processing unit comprising one or more microprocessors, the computer-executable instructions, when executed by the processing unit, cause the computer to:
   execute an application;
   receive a query from the application, the query comprising natural language input;
   automatically separate the query into a plurality of tokens;
   automatically using a model to rank tasks in a plurality of tasks,
      each task in the plurality of tasks having a standardized interface,
      each task in the plurality of tasks being an action performed by the application in response to particular natural language inputs, the standardized interface comprising:
  a slot component that specifies a plurality of slots, each slot in the plurality of slots specifying a slot name and a slot type,
  a keyword component that specifies a plurality of keywords,
  a name component that specifies a task name,
  an entity component that specifies a plurality of named entities
  a recognizer component that specifies a plurality of recognizers, and
  an execute method;
automatically select a selected task in the plurality of tasks,
  the selected task being ranked highest,
  the plurality of keywords of the selected task matching tokens in the plurality of tokens,
automatically use the recognizers of the recognizer component of the selected task to recognize named entities in the plurality of tokens, each of the named entities having specific meanings;
automatically generate a semantic solution, the semantic solution being a hierarchy of markup language elements, the semantic solution comprising semantic condition elements that map slot names of slots in the slot component of the selected task to one or more of the named entities;
automatically present the semantic solution to the application, the application configured to use the semantic solution to execute the selected task by invoking the execute method of the selected task; and
after the application executes the selected task, receive feedback from a user;
automatically update the selected task by modifying, based on the feedback, at least one of:
  a slot name of a slot in the set of slots in the slot component of the selected task, and
  a slot type of a slot in the set of slots in the slot component of the selected task.

10. The computer of claim 9,
  wherein the slot components of tasks in the plurality of tasks comprise one or more annotations; and
  wherein the computer-executable instructions, when executed by the processing unit, cause the computer to use the annotations to interpret the natural language input into the tokens.

11. The computer of claim 9, wherein the application executes the task directly using the semantic solution.

12. The computer of claim 9, the standardized interface further includes a restatement method that, when invoked, returns a restatement of the query.

13. A natural language processor comprising:
  means for defining one or more task interfaces for one or more tasks corresponding to one or more application actions by employing a standard task interface;
  means for defining at least one of one or more keywords or one or more slots for the one or more tasks, wherein defining a slot includes specifying a slot name and a slot type in the standard task interface;
  means for mapping application data as a slot value to the one or more tasks;
  means for linking components of the one or more tasks with at least one application;
  means for employing feedback to update the one or more defined task interfaces; and
  means for updating the one or more task interfaces by modifying at least one of the slot name, the slot type based on user feedback.

* * * * *